(12) United States Patent
Sugo et al.

(10) Patent No.: US 9,239,066 B2
(45) Date of Patent: Jan. 19, 2016

(54) HYDRAULIC CONTROLLER OF DRIVING FORCE DISTRIBUTION DEVICE

(75) Inventors: Yasuhiko Sugo, Wako (JP); Ryuichi Murakami, Wako (JP); Kenichiro Hayashi, Wako (JP); Nobutaka Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 14/009,051

(22) PCT Filed: Apr. 9, 2012

(86) PCT No.: PCT/JP2012/059658
§ 371 (c)(1),
(2), (4) Date: Sep. 30, 2013

(87) PCT Pub. No.: WO2012/141128
PCT Pub. Date: Oct. 18, 2012

(65) Prior Publication Data
US 2014/0020374 A1    Jan. 23, 2014

(30) Foreign Application Priority Data

Apr. 13, 2011    (JP) ................. 2011-089124

(51) Int. Cl.
*B60K 23/08*    (2006.01)
*F15B 15/18*    (2006.01)
*B60K 17/348*    (2006.01)

(52) U.S. Cl.
CPC ............... *F15B 15/18* (2013.01); *B60K 17/348* (2013.01); *B60K 23/08* (2013.01); *B60K 23/0808* (2013.01); *B60K 2023/0866* (2013.01)

(58) Field of Classification Search
CPC ..... B60K 17/35; B60K 23/08; B60K 23/0808

USPC ................................ 60/431, 435; 180/248
See application file for complete search history.

(56) References Cited

U.S. PATENT DOCUMENTS 5,927,425 A * 7/1999 Kusano ............. B60K 23/0808
                                                        180/248

FOREIGN PATENT DOCUMENTS

JP    09-254674 A    9/1997
JP    2004-019768 A    1/2004

(Continued)

OTHER PUBLICATIONS

Office Action dated Jun. 3, 2015, issued in counterpart Chinese application No. 201280017237.X (w/English translation and Search Report) (11 pages).

(Continued)

*Primary Examiner* — Thomas E Lazo
(74) *Attorney, Agent, or Firm* — Westerman, Hattori, Daniels & Adrian, LLP

(57) ABSTRACT

In a hydraulic controller of driving force distribution device, including: a hydraulic circuit composed of an oil pump for supplying hydraulic fluid to a piston chamber of a clutch (or a driving force distribution device), an opening and closing valve installed in an oil passage between a check valve and the piston chamber, and an accumulator communicating to the piston chamber; control is performed so that the piston chamber reaches a target hydraulic pressure based on the 1st characteristic by closing the opening and closing valve and driving the oil pump at the time of pressurizing the piston chamber; and control is performed so that the piston chamber reaches a target hydraulic pressure based on the 2nd characteristic by prohibiting the driving of the oil pump along with opening the opening and closing valve.

4 Claims, 10 Drawing Sheets

(56) References Cited

FOREIGN PATENT DOCUMENTS

| JP | 2007-131194 A | 5/2007 |
|---|---|---|
| JP | 2001-206092 A | 7/2007 |
| JP | 2007-203892 A | 8/2007 |
| JP | 2011-037404 A | 2/2011 |

OTHER PUBLICATIONS

International Search Report for PCT/JP2012/059658, Mailing Date of Jun. 26, 2012.
Japanese Office Action dated Dec. 10, 2013, in corresponding Japanese Application No. 2013-509897 with English Translation. (6 pages).

* cited by examiner

Pressurization

Retention

Depressurization

Rising side P-T characteristics

| Stage | Commanded torque (Nm) | Commanded hydraulic pressure (MPa) |
|---|---|---|
| 1 | 50 | 0.05 |
| 2 | 100 | 0.12 |
| 3 | 150 | 0.18 |
| 4 | 200 | 0.25 |
| 5 | 250 | 0.32 |
| 6 | 300 | 0.39 |
| 7 | 350 | 0.46 |

FIG.8

HYDRAULIC CONTROLLER OF DRIVING FORCE DISTRIBUTION DEVICE

TECHNICAL FIELD

The present invention relates to a hydraulic controller to control the hydraulic pressure for generating the engagement pressure of a clutch installed in a driving force distribution device, in a driving force distribution device of a four-wheel drive vehicle that distributes driving force from a motor to main driving wheels and sub-driving wheels.

BACKGROUND ART

Conventionally, there are four-wheel drive vehicles equipped with a driving force distribution device for distributing driving force generated in a driving source such as an engine to main driving wheels and sub-driving wheels. In a four-wheel drive vehicle of this type, for example, when front wheels are the main driving wheels and rear wheels are the sub-driving wheels, the driving force generated in the driving source is transmitted to the driving force distribution device with a multi-plate clutch via a propeller shaft, as well as being transmitted to the front wheels via a front drive shaft and a front differential. And, the engagement pressure of driving force distribution device is controlled by supplying hydraulic fluid at a predetermined pressure from a hydraulic controller to the driving force distribution device. Thus, the driving force of driving source is transmitted to the rear wheels at a predetermined distribution ratio.

Also, as a hydraulic controller for controlling hydraulic pressure supplied to the multi-plate clutch of the driving force distribution device, conventionally there are hydraulic controllers as shown in Patent Documents 1 and 2. The hydraulic controllers shown in Patent Documents 1 and 2 include an electric oil pump to supply hydraulic fluid to a hydraulic chamber for pressing the multi-plate clutch and are configured to connect the electric oil pump and the hydraulic chamber with a hydraulic supply passage. In the hydraulic controller of Patent Document 1, the rotational speed of the electric pump is controlled such that the discharge value of the electric pump becomes the required operating pressure of the hydraulic clutch. In the hydraulic controller described in Patent Document 2, the motor drive of the electric pump is controlled so as to generate hydraulic pressure in accordance with the distribution ratio of driving force.

However, in the hydraulic controllers of Patent Documents 1 and 2, due to a configuration that supplies hydraulic pressure necessary for the hydraulic clutch by driving the electric pump, it is necessary to operate the electric oil pump constantly at the time of engagement of the hydraulic clutch. Therefore, when a brush motor is used as a motor to drive the electric oil pump, it is difficult to guarantee the durability of the motor (brush abrasion).

Further, in a system that controls the engagement pressure of the clutch by the hydraulic pressure of hydraulic fluid as mentioned above, the relationship between the engagement pressure and torque of the clutch has desirably linear characteristics. However, due to the presence of hysteresis characteristics of clutch torque, such linear characteristics may not be attained. As a countermeasure thereto, the characteristics of clutch torque has been conventionally needed to be improved by making changes to the hardware configuration such as the shape of clutch plate. However, such changes in the structure of clutch may lead to a cost increase and complexity of the structure of product.

CITATION LIST

Patent Document

[Patent Document 1]
Japanese Patent Application Publication No. 2004-19768
[Patent Document 2]
Japanese Patent Application Publication No. 2001-206092

SUMMARY OF THE INVENTION

Problems To Be Solved By the Invention

In view of the above-described problems, the present invention has an object to provide a hydraulic controller of driving force distribution device that can reduce the number of operation of electric oil pump, as well as improve accuracy of clutch torque, with simple configuration and control.

Means For Solving the Problems

In order to solve the problems mentioned above, the present invention is directed to a hydraulic controller (60) of a driving force distribution device. The hydraulic controller of driving force distribution device includes a four-wheel drive vehicle (1) including a driving force transmission path (20) to transmit the driving force from a driving source (3) to main driving wheels (W1, W2) and sub-driving wheels (W3, W4), and a driving force distribution device (10) that is arranged between the driving source (3) and the sub-driving wheels (W3, W4) in the driving force transmission path (20), and composed of a frictional engagement element (10) having multiple stacked friction materials (13) and a piston chamber (15) to generate hydraulic pressure for a piston (12) that presses and engages the friction materials (13) in the stacking direction.

The hydraulic controller (60) of driving force distribution device also includes a hydraulic circuit (30) composed of an oil pump (35) driven by a motor (37) for supplying hydraulic fluid to the piston chamber (15), hydraulic fluid charging valves (39, 53) for containing the hydraulic fluid in the oil passage (49) leading from the oil pump (35) to the piston chamber (15), an opening and closing valve (43) for opening and closing the oil passage (49) between the hydraulic fluid charging valves (39, 53) and piston chamber (15), and an accumulator (18) for storing the hydraulic pressure of the piston chamber (15).

The hydraulic controller (60) of driving force distribution device also includes a control means (50) to supply desired hydraulic pressure to the piston chamber (15) by controlling the driving of the oil pump (35) by the motor (37) and the opening and closing of the opening and closing valve (43).

In this case, as characteristics of hydraulic pressure applied to the piston chamber (15) in the hydraulic circuit (30), a 1st characteristic is obtained by closing the opening and closing valve (43) and driving the oil pump (35), and a 2nd characteristic is obtained by prohibiting the driving of the oil pump (35) along with opening the opening and closing valve (43).

Moreover, the control means (50), at the time of pressurizing the piston chamber (15), performs control so that the piston chamber (15) reaches the target hydraulic pressure based on the 1st characteristic, and at the time of depressurizing the piston chamber (15), performs control so that the piston chamber (15) reaches the target hydraulic pressure based on the 2nd characteristic.

The hydraulic controller of driving force distribution device according to the present invention ensures a hydraulic circuit capable of containing hydraulic fluid in the oil passage between the hydraulic fluid charging valve and the piston chamber, by including a hydraulic circuit composed as described above. Thus, as characteristics of the hydraulic pressure applied to the piston chamber by the hydraulic circuit, a 1st characteristic obtained by closing an opening and closing valve and driving the oil pump, and a 2nd characteristic obtained by prohibiting the driving of the oil pump along with opening the opening and closing valve can be achieved.

The hydraulic controller according to the present invention enables to intermittently operate the motor for driving the oil pump, while engagement pressure is being generated in the clutch, by adopting the above-described hydraulic circuit of charging type. Therefore, durability improvement can be achieved by reducing the number of operation of motor.

Further, the hydraulic pressure-torque characteristics at the time of pressurization and depressurization of the piston chamber can be interchanged, by performing control so that the piston chamber reaches the target hydraulic pressure based on the 1st characteristic at the time of pressurizing the piston chamber, and by performing control so that the piston chamber reaches the target hydraulic pressure based on the 2nd characteristic at the time of depressurizing the piston chamber. This enables to improve the accuracy of the torque of frictional engagement elements, as the torque characteristics of frictional engagement elements can be brought closer to linear characteristics, even if hysteresis is present in the torque characteristics of frictional engagement elements.

Further, in the above-described hydraulic controller, the control means (50) may keep the engagement force of frictional engagement elements (10) constant at the hydraulic pressure of the hydraulic fluid contained in the oil passage (49), by stopping the driving of the oil pump (35) with the motor (37), until starting the depressurization of the piston chamber (15), after pressurizing the piston chamber (15) to reach the target hydraulic pressure.

The hydraulic controller according to the present invention enables, by adopting a hydraulic circuit of charging type as described above, to keep the engagement force of frictional engagement elements constant at the hydraulic pressure of the hydraulic fluid contained in the oil passage, until starting the depressurization of the piston chamber, by stopping the driving of the oil pump with the motor after pressurizing the piston chamber to reach the target hydraulic pressure. This enables to operate the motor for driving the oil pump intermittently while generating engagement pressure in the frictional engagement elements. Therefore, durability improvement can be achieved by reducing the number of operation of motor.

Further, in the hydraulic controller according to the present invention, by performing the driving of the oil pump (35) and the opening and closing of the opening and closing valve (43) in stages, in the 1st characteristic and 2nd characteristic, the hydraulic pressure of the piston chamber (15) and the torque of the clutch (10) should be controlled to change in stages. If adopting a technique to do pressure regulation of hydraulic pressure in stages in this manner, the motor for driving the oil pump can be operated intermittently even when the piston chamber is pressurized. Therefore, durability improvement can be achieved by reducing the number of operation of motor.

Further, in the hydraulic controller according to the present invention, the hydraulic control based on the 1st characteristic should be performed by controlling the drive voltage of the motor (37) such that the oil pump (35) reaches a desired discharge rate based on the relationship between a previously measured drive voltage of the motor (37) and a discharge rate of the oil pump (35), and the hydraulic control based on the 2nd characteristic should be performed by controlling the drive voltage of the opening and closing valve (43) such that the opening and closing valve (43) reaches a desired valve opening position based on the relationship between a previously measured drive voltage of the opening and closing valve (43) and a valve opening position.

This configuration enables to reduce dependency on detection means such as hydraulic pressure sensors, as the hydraulic pressure of oil passage and piston chamber can be controlled without using detected values of hydraulic pressure sensors for detecting the hydraulic pressure of the oil passage leading from oil pump to piston chamber and the piston chamber. It is noted that the above reference characters written in parentheses represent, by way of example, reference characters of components of embodiments to be described herein later.

Effects of the Invention

The hydraulic controller of driving force distribution device according to the present invention enables to reduce the number of operation of the motor that drives the oil pump, as well as to improve the accuracy of clutch torque, with a simple configuration and control.

BRIEF DESCRIPTION OF THE DRAWINGS

FIG. 3A is a flowchart showing a procedure at time of pressurization, and FIG. 3B is a flowchart showing a procedure at time of depressurization.

FIG. 6A is a diagram showing a state of hydraulic fluid at time of pressurization, FIG. 6B is a diagram showing a state of hydraulic fluid at time of hydraulic retention.

FIG. 8 is a diagram showing hydraulic fluid pressure characteristics of piston chamber of clutch and a table showing a map for hydraulic pressure-torque characteristics of pressurization side.

EMBODIMENTS OF THE INVENTION

Figure 1:
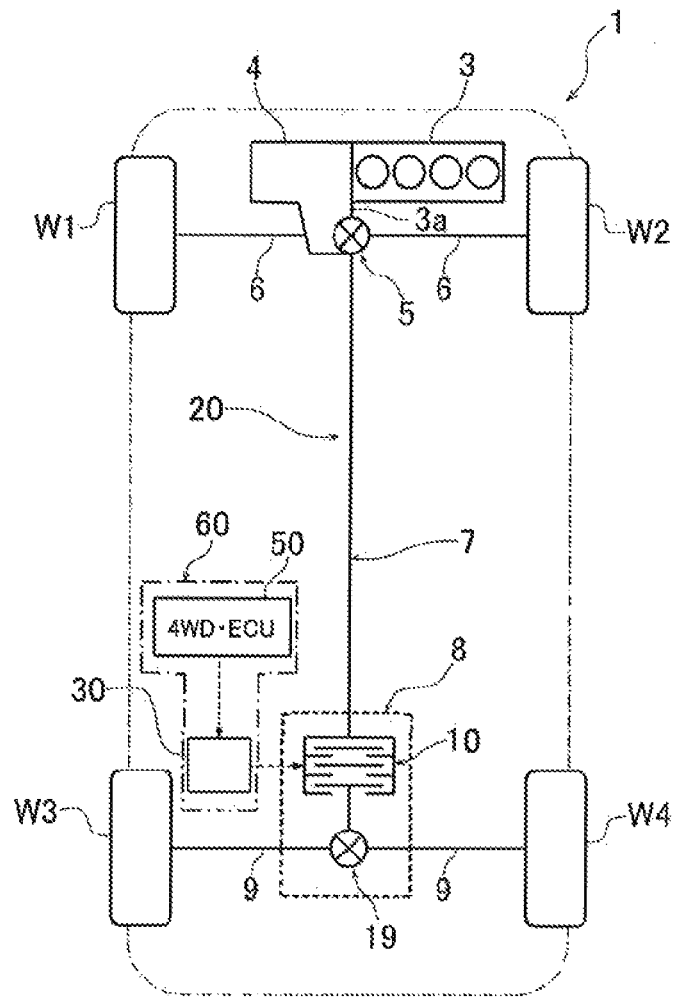
FIG. 1 is a diagram showing a schematic configuration of a four-wheel drive vehicle equipped with a hydraulic controller of driving force distribution device in accordance with an embodiment of the present invention.

Hereinafter, embodiments of the present invention will be described in detail with reference to the appending drawings.
[First Embodiment]
FIG. 1 is a diagram showing a schematic configuration of a four-wheel drive vehicle equipped with a hydraulic controller of driving force distribution device in accordance with an embodiment of the present invention. The four-wheel drive vehicle 1 shown in the same figure comprises an engine (or a driving source) 3 mounted horizontally on a front portion of vehicle, an automatic transmission 4 installed integrally with the engine 3, and a driving force transmission path 20 for transmitting driving force from the engine 3 to front wheels W1, W2 and rear wheels W3, W4.

An output shaft of the engine 3 (not shown in the figure) connects to the left and right front wheels W1, W2 that are main driving wheels via the automatic transmission 4, a front differential (hereinafter, referred to as "front diff") 5, and left and right front drive shafts 6, 6. In addition, the output shaft of the engine 3 connects to the left and right rear wheels W3, W4 that are sub-driving wheels via the automatic transmission 4, the front diff 5, a propeller shaft 7, a rear differential unit (hereinafter, referred to as "rear diff unit") 8, and left and right rear drive shafts 9, 9.

The rear diff unit 8 is equipped with a rear differential (hereinafter, referred to as "rear diff") 19 for distributing driving force to the left and right rear drive shafts 9, 9, and a clutch for front and rear torque distribution 10 for connecting/disconnecting the driving force transmission path from the propeller shaft 7 to the rear diff 19. The clutch for front and rear torque distribution 10 is a hydraulic clutch and a driving force distribution device for controlling driving force distributed to the rear wheels W3, W4 in the driving force transmission path 20. Further, the four-wheel drive vehicle 1 comprises a hydraulic circuit 30 for supplying hydraulic fluid to the clutch for front and rear torque distribution 10, and a 4WD/ECU (hereinafter, simply referred to as "ECU") 50 that is a control means for controlling hydraulic pressure supplied by the hydraulic circuit 30. The ECU 50 is composed of, for instance, a microcomputer.

The ECU 50 controls driving force distributed to the rear wheels W3, W4 with the clutch for front and rear torque distribution (hereinafter, simply referred to as "clutch") 10, by controlling hydraulic pressure supplied by the hydraulic circuit 30. Thus, drive control is performed such that the front wheels W1, W2 are main driving wheels and the rear wheels W3, W4 are sub-driving wheels.

In other words, When the clutch 10 is released (or disconnected), rotation of the propeller shaft 7 is not transmitted to the rear diff 19, and entire torque of the engine 3 is transmitted to the front wheels W1, W2, which leads to a front wheel drive (2WD) state. On the other hand, when the clutch 10 is connected, torque of the engine 3 is distributed to both the front wheels W1, W2 and the rear wheels W3, W4 by transmitting rotation of the propeller shaft 7 to the rear diff 19, which leads to a four-wheel drive (4WD) state. Based on the detection with various detection means (not shown in the figure) for detecting a running state of vehicle, the ECU 50 calculates driving force to be distributed to the rear wheels W3, W4 and amount of corresponding hydraulic pressure to be supplied to the clutch 10, as well as outputs a drive signal based on the calculation results to the clutch 10. Thus, engaging power of the clutch 10 is controlled, and driving force distributed to the rear wheels W3, W4 is controlled.

Figure 2:
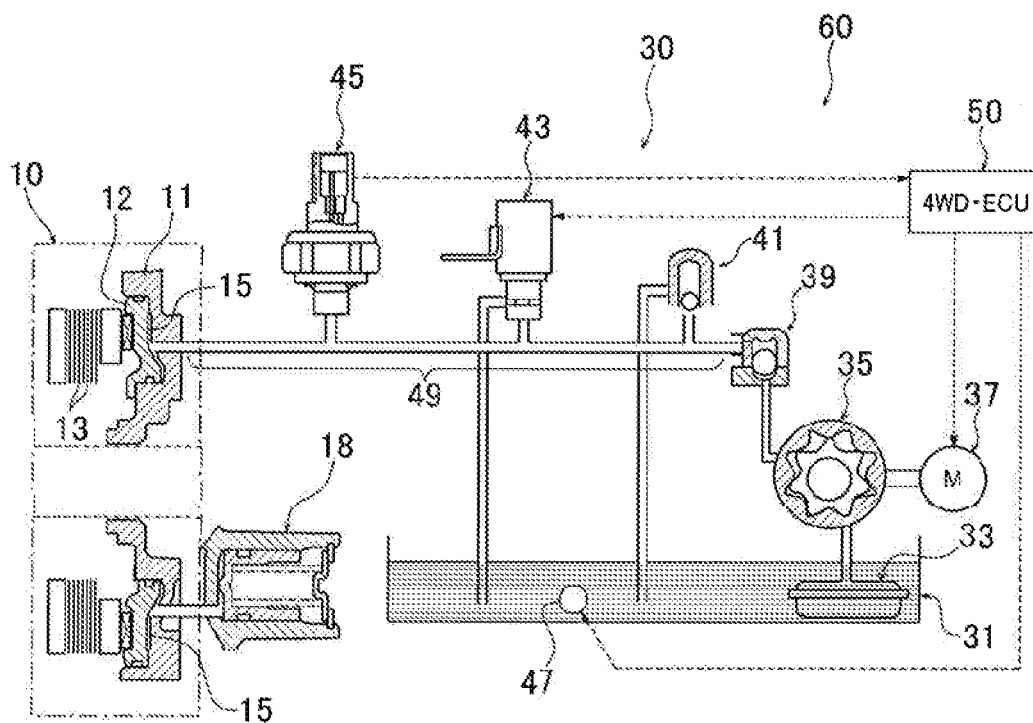
FIG. 2 is a diagram showing a hydraulic circuit of hydraulic controller.

FIG. 2 is a hydraulic circuit diagram showing a detailed configuration of the hydraulic circuit 30. The hydraulic circuit 30 shown in the same figure comprises an oil pump 35 for suctioning and pumping hydraulic fluid stored in an oil tank 31 via a pumping strainer 33, a motor 37 to drive the oil pump 35, and an oil passage 49 communicating from the oil pump 35 to the piston chamber 15 of the clutch 10.

The clutch 10 comprises a cylinder housing 11, and a piston 12 that presses multiple stacked friction materials 13 by moving forward and backward in the cylinder housing 11. In the cylinder housing 11, the piston chamber 15, to which hydraulic fluid is introduced, is defined between the cylinder housing 11 and the piston 12. The piston 12 is arranged opposing one end of stacking direction in the multiple friction materials 13. Therefore, the piston 12 presses the friction materials 13 in stacking direction with hydraulic pressure of hydraulic fluid supplied in the piston chamber 15, thereby engaging the clutch 10 with a predetermined engagement pressure.

In the oil passage 49 communicating from the oil pump 35 to the piston chamber 15, a check valve 39, a relief valve 41, a solenoid valve (or an opening and closing valve) 43, and a hydraulic pressure sensor 45 are installed in this order. The check valve 39 circulates hydraulic fluid from oil pump 35 side towards piston chamber 15 side, but is configured to prevent flow of hydraulic fluid in an opposite direction. This enables to contain hydraulic fluid pumped to downstream side of the check valve 39 by driving the oil pump 35, in the oil passage (hereinafter, referred to as "charging oil passage") 49 between the check valve 39 and the piston chamber 15. The hydraulic circuit 30 of charging type is composed of an oil passage 49 provided with the above-described check valve 39 and oil pump 35. In the present embodiment, the check valve 39 is a hydraulic fluid charging valve for containing hydraulic fluid in the oil passage 49 leading to the piston chamber 15 from the oil pump 35.

The relief valve 41 is a valve configured to release hydraulic pressure of the oil passage 49 by opening when pressure of the oil passage 49 between the check valve 39 and the piston chamber 15 exceeds a predetermined threshold value and rises abnormally. Hydraulic fluid discharged from the relief valve 41 returns to the oil tank 31. The solenoid valve 43 is an opening and closing valve of on-off type, and can control opening and closing of the oil passage 49 by being PWM-controlled (or duty-controlled) based on commands of the ECU 50. This enables to control hydraulic pressure of the piston chamber 15. It is noted that hydraulic fluid discharged from the oil passage 49 by opening the solenoid valve 43 returns to the oil tank 31. Also, the hydraulic pressure sensor 45 is a hydraulic pressure detection means for detecting hydraulic pressure of the oil passage 49 and the piston chamber 15, and detected values thereof are sent to the ECU 50. Also, the piston chamber 15 communicates to the accumulator 18. The accumulator 18 has a function to suppress sudden changes in hydraulic pressure and pulsation of hydraulic pressure in the piston chamber 15 and the oil passage 49. Also, an oil temperature sensor 47 for detecting temperature of hydraulic fluid is installed in the oil tank 31. Values detected by the oil temperature sensor 47 are sent to the ECU 50.

Figures 3A, 3B:
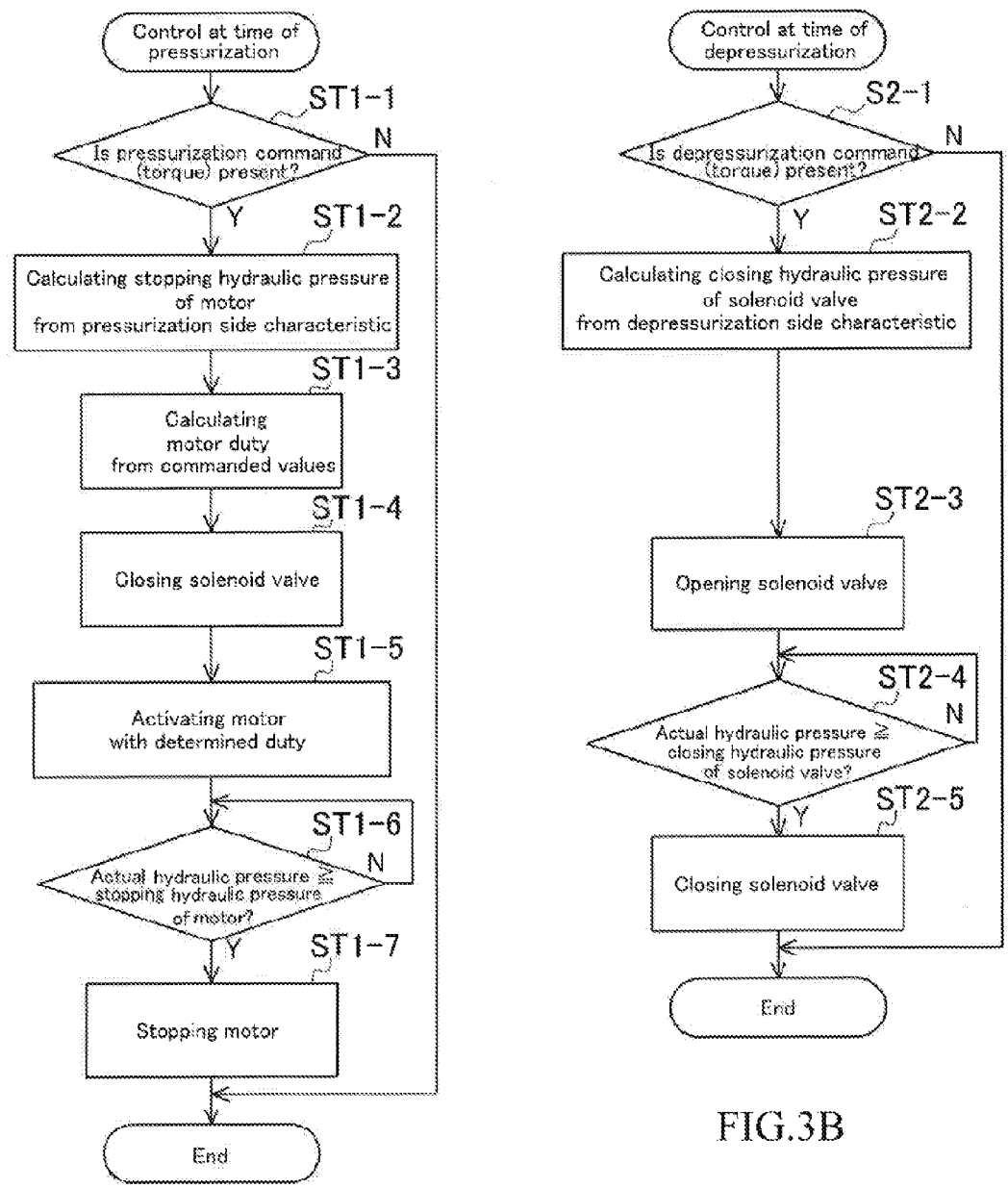
FIG. 3A and FIG. 3B are flowchart showing procedures for hydraulic control of piston chamber.
Figure 4:
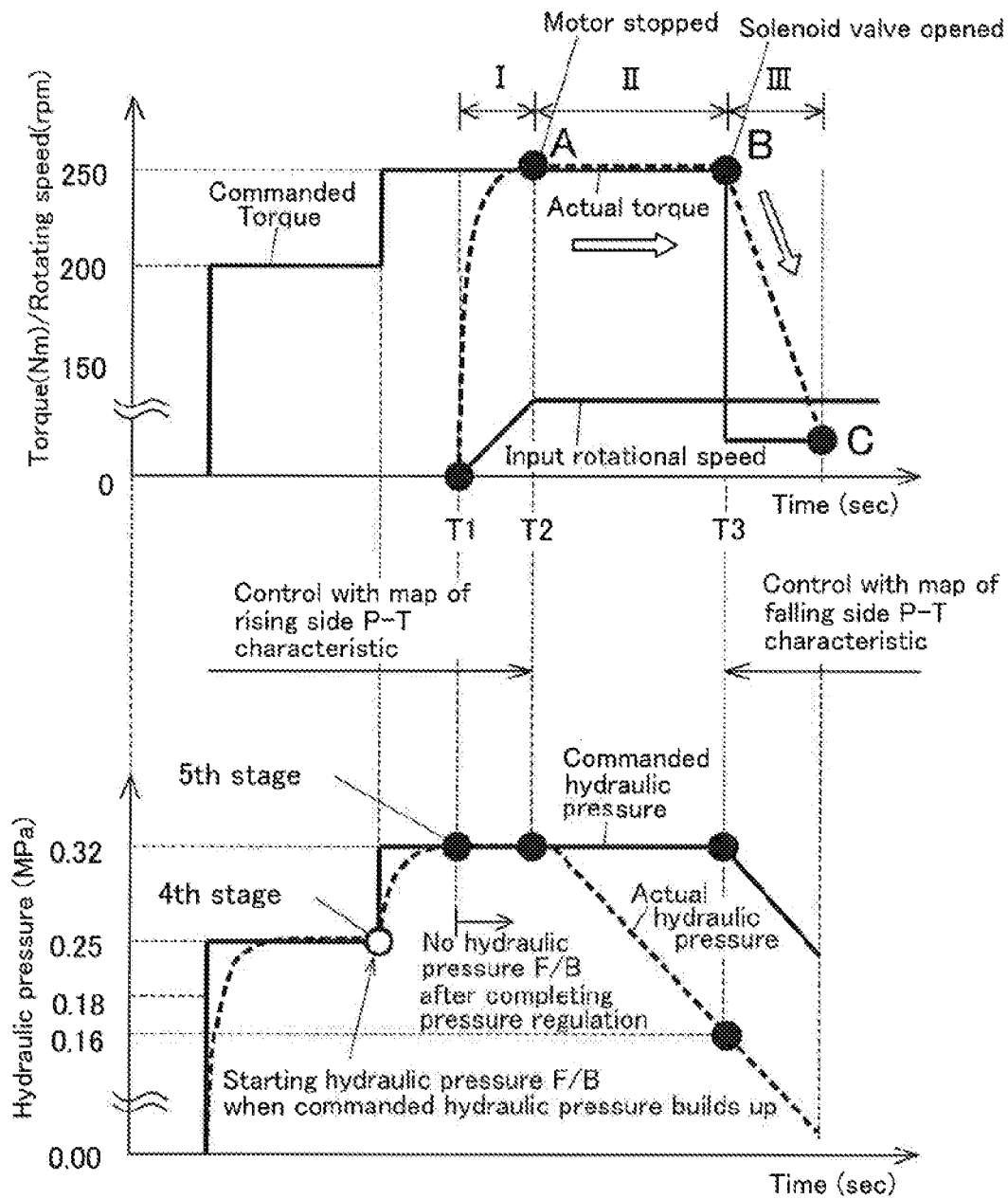
FIG. 4 is a timing chart showing changes of commanded torque and actual torque of clutch, changes of input rotational speed of clutch, and changes of commanded hydraulic pressure and actual hydraulic pressure of piston chamber in hydraulic control of piston chamber.
Figure 5:
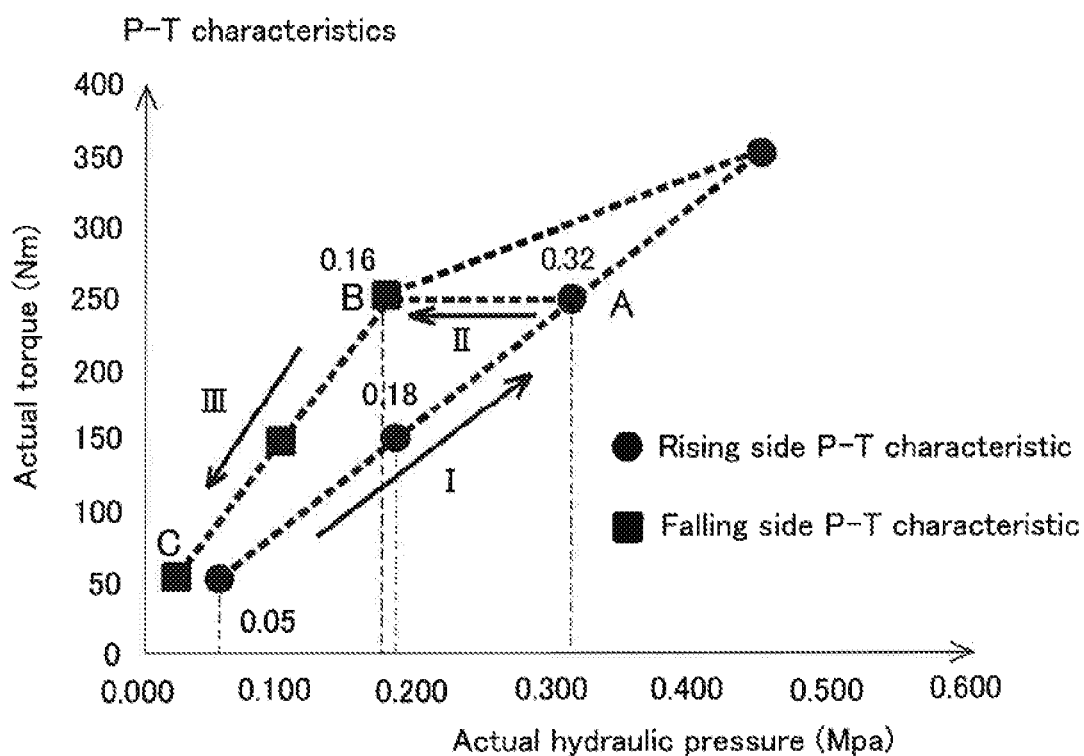
FIG. 5 is a graph showing relationship (hydraulic pressure-torque characteristics) of actual hydraulic pressure and actual torque in hydraulic control of piston chamber.
Figure 6A:
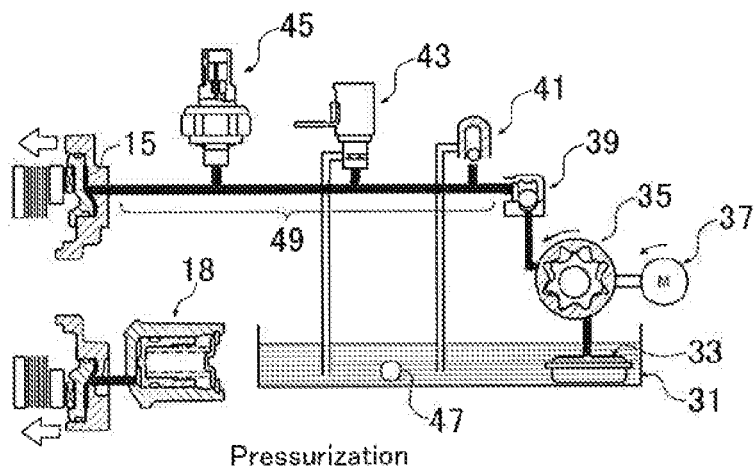
FIG. 6A and FIG. 6B are circuit diagram showing a state of hydraulic fluid in an oil passage in hydraulic control of piston chamber.
Figure 6B:
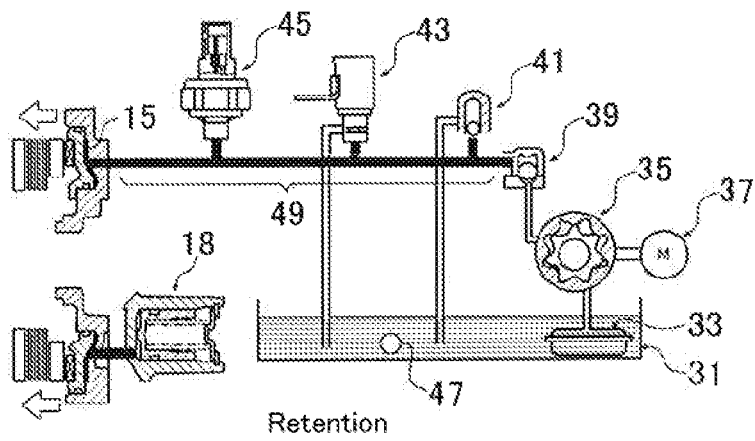
Figure 6C:
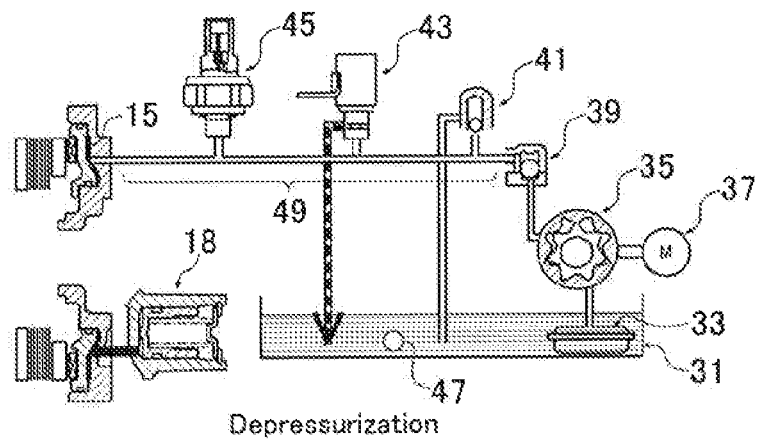
FIG. 6C is a diagram showing a state of hydraulic fluid at time of depressurization.
Figure 7:
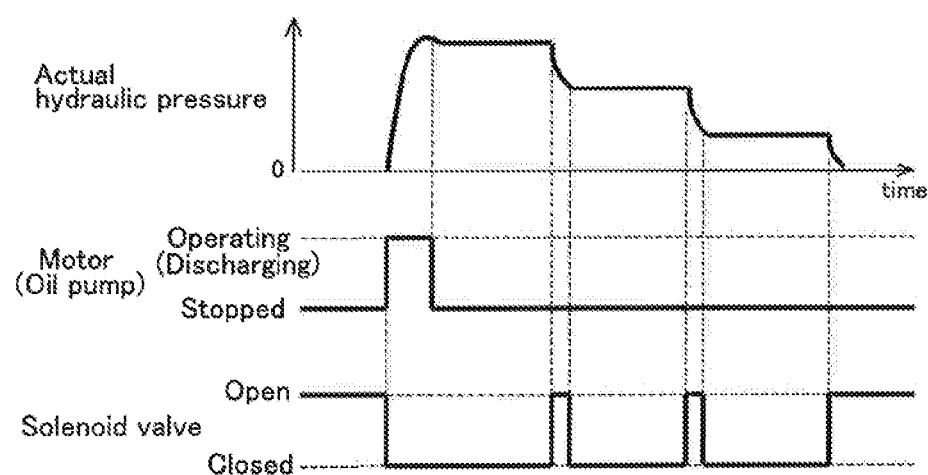
FIG. 7 is a timing chart showing changes of operating/stopped state of motor (or oil pump) and open/closed state of solenoid valve, and actual hydraulic pressure in hydraulic control of piston chamber.

FIG. 3A and FIG. 3B are flowcharts showing procedures of hydraulic control with the hydraulic controller 60 of the present embodiment, FIG. 3A is a flowchart showing a control procedure at time of pressurization of the piston chamber 15, and FIG. 3B is a flowchart showing a control procedure at time of depressurization of the piston chamber 15. FIG. 4 is a timing chart showing changes of commanded torque and actual torque of the clutch 10, changes of rotational speed input to the clutch 10, and changes of commanded hydraulic pressure and actual hydraulic pressure of the piston chamber 15, when performing hydraulic control. FIG. 5 is a graph showing relationship between actual hydraulic pressure and actual torque (or hydraulic pressure-torque characteristics, or P-T characteristics) in hydraulic control of the piston chamber 15. FIG. 6A, FIG. 6B and FIG. 6C are circuit diagrams showing a state of the hydraulic fluid in the oil passage 49 in hydraulic control of the piston chamber 15, wherein FIG. 6A is a diagram showing a state of hydraulic fluid at time of pressurization, FIG. 6B is a diagram showing a state of hydraulic fluid at time of hydraulic retention, and Fig,6C is a diagram showing a state of hydraulic fluid at time of depressurization. FIG. 7 is a timing chart showing relationship between an operating/stopped state of the motor 37 (or the oil pump 35), an open/closed state of the solenoid valve 43 and actual hydraulic pressure in hydraulic control of the piston chamber 15. FIG. 8 is a diagram showing hydraulic fluid pressure characteristics of the piston chamber 15 of the clutch 10, and is a table showing hydraulic pressure-torque characteristics at time of pressurization (or of rising side).

In hydraulic control with the hydraulic controller 60 of the present embodiment, the hydraulic circuit 30 has a pressurization side for a rising side) hydraulic pressure-torque characteristic or a 1st characteristic) applicable when pressurizing the piston chamber 15 and a depressurization side (or a falling side) hydraulic pressure-torque characteristic (or a 2nd characteristic) applicable when depressurizing the piston chamber 15, as hydraulic characteristics thereof. When pressurizing the piston chamber 15, control is performed so that the piston chamber 15 reaches a target hydraulic pressure based on a pressurization side hydraulic pressure-torque characteristic by controlling (or dutycontrolling) drive of the motor 37 (or oil pump 35). And, after pressurization until the piston chamber 15 reaches a target hydraulic pressure based on a pressurization side hydraulic pressure-torque characteristic, torque of the clutch 10 can be kept constant until starting depressurization, by maintaining a state that hydraulic oil is contained in the charging oil passage 49. On the other hand, when depressurizing the piston chamber 15, control is performed so that the piston chamber 15 reaches a target hydraulic pressure based on a depressurization side hydraulic pressure-torque characteristic, by prohibiting operation of the oil pump 35 as well as controlling for dutycontrolling) opening/closing of the solenoid valve 43.

A procedure of hydraulic control when pressurizing and depressurizing the piston chamber 15 will be described based on the flowchart of FIG. 3. First, in a control flow at time of pressurization shown in the same FIG. 3A, the ECU 50 determines whether or not a pressurization command (a commanded torque) exists for the piston chamber 15 (STEP ST1-1). Presence/absence of pressurization command for the piston chamber 15 is determined by whether or not there is a request for engaging the clutch (or the driving force distribution device) 10 or a request to increase engaging power thereof, as a result of having determined driving force distributed to the front wheels W1, W2 and the rear wheels W3, W4 depending on a running state of vehicle. As a result, if there is no pressurization command for the piston chamber 15 (NO), the process ends as it is. On the other hand, if a pressurization command is present (YES), in continuation, based on a table for pressurization side hydraulic pressure-torque characteristic shown in FIG. 8, a second step calculates stopping hydraulic pressure (commanded hydraulic pressure) of the oil pump 35 (or the motor 37) (STEP ST1-2), and a third step determines a duty ratio of PWM control to drive the motor 37 from the commanded hydraulic pressure that has been calculated (STEP ST1-3). Subsequently, when the solenoid valve 43 is open, a fourth step puts the oil passage 49 into a sealed state by closing the solenoid valve 43 (STEP ST1-4), and a fifth step operates the oil pump 35 by driving the motor 37 at the determined duty ratio (STEP ST1-5). As a result, hydraulic fluid is pumped into the oil passage 49 between the check valve 39 and the piston chamber 15, and hydraulic pressure of the oil passage 49 and the piston chamber 15 rises. Subsequently a sixth step determines whether or not hydraulic pressure (or actual hydraulic pressure) of the oil passage 49 and the piston chamber 15 detected by the hydraulic pressure sensor 45 has become equal to or more than stopping hydraulic pressure (or commanded hydraulic pressure) of the oil pump 35 (or the motor 37) (STEP ST1-6). If hydraulic pressure of the oil passage 49 and the piston chamber 15 reaches stopping hydraulic pressure of the oil pump 35 (YES), a seventh step stops operation of the oil pump 35 (or the motor 37) (ST1-7), thereby ending control at time of pressurization.

On the other hand, in a control flow at time of depressurization shown in FIG. 3B, the ECU 50 determines whether or not a depressurization command (a commanded torque) exists for the piston chamber 15 (ST2-1). A depressurization command for the piston chamber 15 are determined by whether or not there is an engagement release request or a request to decrease the engaging power of the clutch (driving force distribution device) 10, as a result of having determined the driving force distributed to the front wheels W1, W2 and rear wheels W3, W4 depending on the running state of the vehicle. As a result, if there is no depressurization command (NO), the process ends as it is. On the other hand, if a depressurization command is present (YES), in continuation, based on a table for depressurization side hydraulic pressure-torque characteristic, a second step calculates closing hydraulic pressure (commanded hydraulic pressure) of the solenoid valve 43 (ST2-2). Subsequently, a third step releases a sealed state of the oil passage 49 by opening the solenoid valve 43 (ST2-3), and controls hydraulic pressure of the oil passage 49 and piston chamber 15 based on a depressurization side hydraulic pressure-torque characteristic. As a result, hydraulic fluid of the oil passage 49 is discharged via the solenoid valve 43, whereby hydraulic pressure falls. Subsequently, a fourth step determines whether or not hydraulic pressure (or actual hydraulic pressure) of the oil passage 49 and piston chamber 15 detected by the hydraulic pressure sensor 45 has become equal to or less than closing hydraulic pressure (or commanded hydraulic pressure) of the solenoid valve 43 (ST2-4). If the hydraulic pressure of the oil passage 49 and piston chamber 15 reaches closing hydraulic pressure of the solenoid valve 43 (YES), a fifth step closes the solenoid valve 43 (ST2-5), thereby ending control at time of depressurization.

Hydraulic control with the hydraulic controller 60 of the present embodiment will be described in more detail. In a timing chart of FIG. 4, until reaching time T2, hydraulic control at time of pressurization is performed in accordance with the flowchart of FIG. 3A based on a pressurization side hydraulic pressure-torque characteristic. In this hydraulic control at time of pressurization, commanded hydraulic pressure of the oil passage 49 and the piston chamber 15 and commanded torque of the clutch 10 are controlled so as to change progressively in multiple stages. It is noted that, while the graph of FIG. 4 shows changes of commanded hydraulic pressure and commanded torque in two stages only, in reality, commanded hydraulic pressure and commanded torque can be progressively changed in any number of positions within a number of positions (seven stages in the figure) set in a table for pressurization side hydraulic pressure-torque characteristic (ref. to FIG. 8). As described above, in this hydraulic control at time of pressurization, by controlling driving of the oil pump 35 depending on commanded hydraulic pressure, hydraulic pressure of the piston chamber 15 is controlled to reach a target hydraulic pressure (0.32 MPa in an example of FIG. 4) corresponding to a desired torque. Further, hydraulic fluid in the hydraulic circuit 30 at time of pressurization is in a state shown in FIG. 6A.

Further, in an example shown in timing chart of FIG. 4, at time T1 that is earlier than time T2, driving force is input from a rear duff 19 side to the clutch 10. As a result, in interval I shown in FIG. 4 and FIG. 5, a torque (or an actual torque) applied to the clutch 10 rises. The actual torque rises until matching a commanded torque. Variation of torque (or actual torque) with respect to hydraulic pressure (or actual hydraulic pressure) at this time will be a variation with a constant slope that connects plot of circles in the graph of FIG. 5. Characteristic indicated by a line that connects the plot of circles is pressurization side (or rising side) hydraulic pressure-torque characteristic.

In hydraulic control at time of pressurization (mainly in interval I in the figures), a torque that depends on pressurization side hydraulic pressure-torque characteristic is generated in the clutch 10, due to effects of hydraulic feedback control that controls driving of the oil pump 35 based on hydraulic pressure detected by the hydraulic pressure sensor 45 and effects of suppression of hydraulic pressure changes with the accumulator 18. In other words, after pressure regulation so that hydraulic pressure of the oil passage 49 reaches a target hydraulic pressure due to the above-described feedback control, a torque that depends on pressurization side hydraulic pressure-torque characteristic is generated by inputting rotation (or driving force) to the clutch 10 from a rear diff 19 side. It is noted that, in this case, since rotation is input after pressure regulation of hydraulic pressure, a generated torque is less impacted by friction for friction of clutch guide and clutch plate) of the friction materials 13. Therefore, pressurization side hydraulic pressure-torque characteristic becomes such a characteristic as a slope shown with a plot of circles in FIG. 5.

Further, as shown in a timing chart of FIG. 4, in hydraulic control at time of pressurization based on pressurization side hydraulic pressure torque characteristic, hydraulic feedback control starts when instructions of hydraulic pressure of each position start (or when commanded hydraulic pressure builds up). And, hydraulic feedback control ends when pressure regulation towards target hydraulic pressure is completed.

Subsequently, operation of the motor 37 (or the oil pump 35) stops when an actual torque becomes equal to a commanded torque at time T2. Hydraulic fluid in the hydraulic circuit 30 at the time of hydraulic pressure retention for in interval II in FIGS. 4 and 5) is in a state shown in FIG. 6B. Due to a state at this time that hydraulic fluid of commanded hydraulic pressure is contained in the oil passage 49, even if operation of the oil pump 35 stops, a torque (or an actual torque) of the clutch 10 is maintained constant for a while. However, during this period, actual hydraulic pressure of the oil passage 49 gradually decreases with time due to slight leakage of hydraulic fluid from each part of the oil passage 49.

In hydraulic control at time of hydraulic retention, hydraulic feedback control by driving the oil pump 35 and opening and closing the solenoid valve 43 is not carried out. Hydraulic pressure changes during this period are dependent only on sealing performance of the oil passage 49. Even if hydraulic pressure of the oil passage 49 fills due to a leakage of hydraulic pressure from the oil passage 49 during this period, a torque of the clutch 10 becomes constant while the hydraulic pressure transfers from pressurization side hydraulic pressure-torque characteristic to depressurization side hydraulic pressure-torque characteristic.

At time T3, hydraulic pressure (or actual hydraulic pressure) detected by the hydraulic pressure sensor 45 reaches point B of depressurization side hydraulic pressure-torque characteristic. From that point onwards, hydraulic control at time of depressurization is carried out in accordance with the flowchart of FIG. 3B based on depressurization side hydraulic pressure-torque characteristic. Even in hydraulic control at time of depressurization, commanded hydraulic pressure of the oil passage 49 and the piston chamber 15 and commanded torque of the clutch 10 are controlled so as to change progressively in multiple stages. In other words, similar to a map of pressurization side hydraulic pressure-torque characteristic shown in FIG. 8, a map of depressurization side hydraulic pressure-torque characteristic is prepared in advance (not shown in the figure), and in control at time of depressurization, hydraulic pressure of the oil passage 49 and the piston chamber 15 is controlled based on the map. Further, as described above, in this hydraulic control at time of depressurization as described above, by controlling opening/closing of the solenoid valve 43 according to commanded hydraulic pressure, hydraulic pressure of the piston chamber 15 is controlled to fall to a target hydraulic pressure corresponding to a desired torque. Hydraulic fluid in the hydraulic circuit 30 at time of depressurization is in a state shown in FIG. 6C.

In hydraulic control at time of depressurization (or in interval III in FIGS. 4 and 5), a torque that depends on depressurization side hydraulic pressure-torque characteristic is generated due to hydraulic feedback control to control opening/closing of the solenoid valve 43 based on hydraulic pressure detected by the hydraulic pressure sensor 45. It is noted that, in this case, since hydraulic pressure changes after rotation (or driving force) is input from a rear diff 19 side to the clutch 10, depressurization side hydraulic pressure-torque characteristic becomes a characteristic indicated by a line that connects a plot of squares in FIG. 5, in response to an impact such as friction of the friction materials 13.

Further, in pressure regulation of the piston chamber 15 with the hydraulic circuit 30 of charging type as in the present embodiment, pressure regulation at time of pressurization and depressurization becomes a system with a high degree of dependency on the hydraulic pressure sensor 45, when feedback control is performed based on hydraulic pressure detected by the hydraulic pressure sensor 45. On the other hand, if open-loop control is achieved by carrying out a duty drive of each of the oil pump 35 and the solenoid valve 43 by PWM control, dependency on the hydraulic pressure sensor 45 can be reduced. This enables to abolish the hydraulic pressure sensor 45 when necessary.

In other words, in the hydraulic controller 60 of the present embodiment, hydraulic pressure generated by a balance between discharge rate control of the oil pump 35 and pressure regulation of the solenoid valve 43 (or orifice effect) by duty drive can be decided. Then, if duty ratio for driving the motor 37, duty ratio for opening/closing the solenoid valve 43, and oil temperature are measured beforehand and mapped for every generated hydraulic pressure, duty ratio for driving the motor 37 and duty ratio for opening/closing the solenoid valve 43 can be obtained depending on commanded hydraulic pressure and oil temperature. As a result, since driving of the oil pump 35 and opening/closing of the solenoid valve 43 can be controlled without using detected values of the hydraulic pressure sensor 45, degree of dependency on the hydraulic pressure sensor 45 can be reduced.

Further, in pressure regulation of the piston chamber 15 by means of the hydraulic circuit 30 of charging type as in the present embodiment, if configured to release hydraulic pressure of the oil passage 49 by opening/closing the solenoid valve 43 of on-off type, characteristics of hydraulic pressure variation depend on orifice characteristics of a discharge port of the solenoid valve 43. Thus, there is an issue that flexibility of hydraulic pressure characteristics is low. On the other hand, if the solenoid valve 43 is duty driven at time of releasing hydraulic pressure contained in the oil passage 49, discharge rate of the solenoid valve 43 can be varied arbitrarily (or varied towards lowering flow rate). This enables to increase flexibility of hydraulic pressure characteristics.

Further, in the hydraulic controller 60 of the present embodiment, by mapping relationship between a duty ratio of drive voltage of the solenoid valve 43 and a discharge rate of the solenoid valve 43 that has been measured beforehand for each oil temperature, duty ratio of drive voltage of the solenoid valve 43 at time of releasing hydraulic pressure of the oil passage 49 can be obtained for each oil temperature. Moreover, in this case, when duty ratio of drive voltage of the solenoid valve 43 is made variable, monitoring hydraulic pressure of the oil passage 49 by the hydraulic pressure sensor 45 enables to adjust variation of discharge rate due to drop in hydraulic pressure.

As described above, the hydraulic controller 60 of the present embodiment comprises a hydraulic circuit 30 composed of the oil pump 35 driven by the motor 37 for supplying hydraulic fluid to the piston chamber 15, the check valve (or the hydraulic fluid charging valve) 39 installed between the oil pump 35 and the piston chamber 15, the solenoid valve for the opening and closing valve) 43 installed in the oil passage (or the hydraulic fluid charging oil passage) 49 between the check valve 39 and the piston chamber 15, and the accumulator 1$ for storing hydraulic pressure of the piston chamber 15, and an ECU (or a control means) 50 to supply desired hydraulic pressure to the piston chamber 15 by controlling driving of the oil pump 35 with the motor 37 and opening and closing of the opening and closing valve 43.

According to the hydraulic controller 60 of the present embodiment, by comprising a hydraulic circuit 30 configured as described above, the oil passage 49 between the check valve 39 and the piston chamber 15 becomes a hydraulic circuit 30 of charging type capable of containing hydraulic fluid. Thus, the hydraulic circuit 30 has a 1st characteristic (or a pressurization side hydraulic pressure-torque characteristic) by closing the opening and closing valve 43 and driving the oil pump 35, and a 2nd characteristic (or a depressurization side hydraulic pressure-torque characteristic) by prohibiting driving of the oil pump 35 along with opening the opening and closing valve 43, as hydraulic pressure characteristics thereof. The ECU 50, when pressurizing the piston chamber 15, controls such that the piston chamber 15 reaches a target hydraulic pressure based on the 1st characteristic, and when depressurizing the piston chamber 15, controls such that the piston chamber 15 reaches a target hydraulic pressure based on the 2nd characteristic.

In the hydraulic controller 60 according to the present invention, using a hydraulic circuit 30 of charging type as described above enables to operate the motor 37 for driving the oil pump 35 intermittently while hydraulic pressure is being generated to engage the clutch 10. Therefore, durability improvement can be achieved by reducing the number of operation of the motor 37.

Further, by performing control so that the piston chamber 15 reaches a target hydraulic pressure based on the 1st characteristic when pressurizing the piston chamber 15, and performing control so that the piston chamber 15 reaches a target hydraulic pressure based on the 2nd characteristic when depressurizing the piston chamber 15, torque accuracy of the clutch 10 can be improved even if torque characteristics of the clutch 10 have hysteresis.

Further, the hydraulic controller 60 of the present embodiment enables to keep engaging power of the clutch 10 constant with hydraulic pressure of hydraulic fluid contained in the oil passage 49, until depressurization of the piston chamber 15 begins, by stopping the driving of the oil pump 35 by the motor 37, after the piston chamber 15 is pressurized to reach a target pressure, by adopting the hydraulic circuit 30 of charging type as described above. This enables to operate the motor 37 for driving the oil pump 35 intermittently while generating engagement pressure in the clutch 10. Therefore, durability improvement can be achieved by reducing the number of operation of the motor 37.

Further, the hydraulic controller 60 of the present embodiment performs control so that hydraulic pressure of the piston chamber 15 and torque of the clutch 10 change in stages due to 1st characteristic and 2nd characteristic. By adopting a technique to regulate hydraulic pressure in stages in this way, the motor 37 for driving the oil pump 35 can be operated intermittently even when pressurizing the piston chamber 15.

[Second Embodiment]

Next, a second embodiment of the present invention will be described. In the description of the second embodiment and the corresponding figures, like reference characters refer to components corresponding or equivalent to those of the first embodiment and a detailed description thereof is dispensed with. The features other than those described as below are the same as in the first embodiment. The same holds for the other embodiments of the invention.

Figure 9:
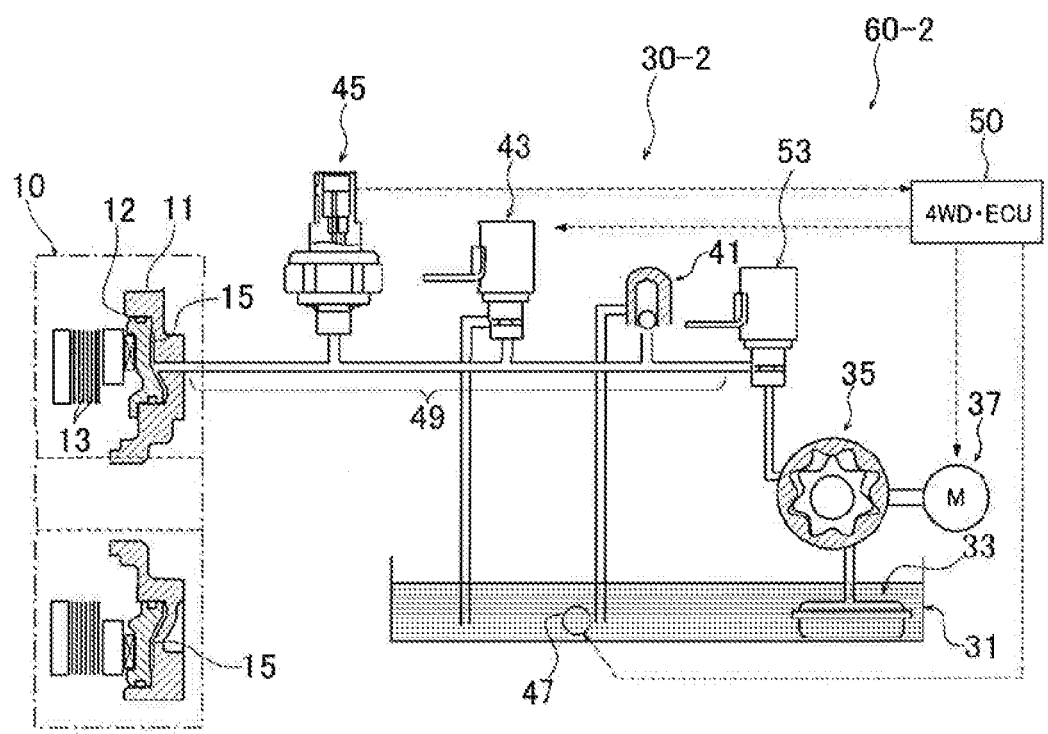
FIG. 9 is a diagram showing a hydraulic circuit provided by a hydraulic controller in accordance with a second embodiment of the present invention.

FIG. 9 is a diagram showing a hydraulic circuit 30-2 provided by a hydraulic controller 60-2 in accordance with the second embodiment of the present invention. The hydraulic controller 60 of the first embodiment carries out closing of the oil passage 49 at time of switching from pressurization to retention by the check valve 39. Therefore, closing performance of the oil passage 49 is dependent on function of the check valve 39. However, a delay in closing with the check valve 39 occurs as viscosity of oil becomes extremely high at a very low temperature, which may generate hydraulic pressure leakage leading to decrease in hydraulic pressure of the oil passage 49 beyond a permissible range.

Due to this, while the hydraulic controller 60 of the first embodiment prevents lowering of hydraulic pressure by installing the accumulator 18 in the oil passage 49, the hydraulic controller 60-2 of the second embodiment, as an alternative technique, omits the accumulator 18 as well as replaces the check valve 39 with a solenoid valve 53 of on-off type. In other words, in the hydraulic circuit 30-2, a first solenoid valve 43 (same as the solenoid valve 43 of the first embodiment) for discharging hydraulic fluid from the oil passage 49 to produce a depressurization side hydraulic pressure-torque characteristic, and a second solenoid valve 53 for containing hydraulic fluid in the oil passage 49 are installed. In the present embodiment, the second solenoid valve 53 is a hydraulic fluid charging valve for containing hydraulic fluid in the oil passage 49 leading to the piston chamber 15 from the oil pump 35.

Figure 10:
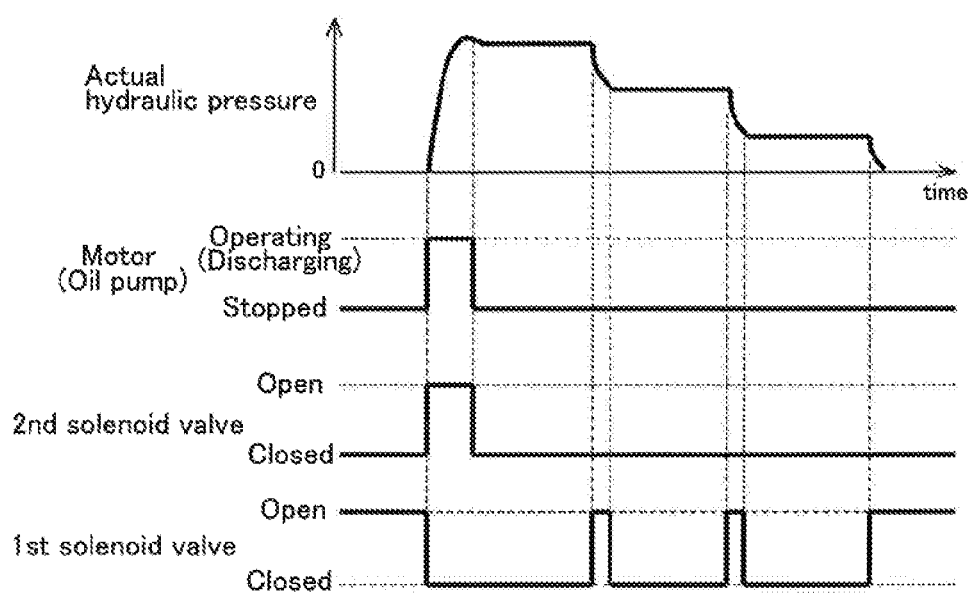
FIG. 10 is a timing chart showing changes of operating/stopped state of motor (or oil pump) and open/closed state of 1st and 2nd solenoid valves, and actual hydraulic pressure in hydraulic controller of a second embodiment.

FIG. 10 is a timing chart showing relationship among operating/stopped states of the motor 37 (or the oil pump 35), open/closed states of the first and second solenoid valves 43, 53, and actual hydraulic pressure in the hydraulic controller 60-2 of the second embodiment In the hydraulic controller 60-2 of the present embodiment, the second solenoid valve 53 is opened at a timing at which operation of the motor 37 (or the oil pump 35) starts, and the second solenoid valve 53 is closed at a timing at which operation of the motor 37 (or the oil pump 35) stops. This enables to contain hydraulic fluid in the oil passage 49 by driving the oil pump 35, similar to the hydraulic controller 60 of the 1st embodiment. In addition, the second solenoid valve 53 can open and close the oil passage 49 regardless of whether degree of viscosity of hydraulic fluid is high or low, which enables to prevent hydraulic pressure leakage due to a delay in closing of the oil passage 49, thereby preventing lowering of hydraulic pressure of the oil passage 49 beyond a permissible limit at a very low temperature.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof.

The invention claimed is:

1. A hydraulic controller of a driving force distribution device comprising:
   a four-wheel drive vehicle comprising a driving force transmission path to transmit driving force from a driving source to main driving wheels and sub-driving wheels and a driving force distribution device that is arranged between the driving, source and the sub-driving wheels in the driving force transmission path, and the driving force distribution device composed of a frictional engagement element having multiple stacked friction materials and a piston chamber to generate hydraulic pressure for a piston that presses and engages the friction materials in the stacking direction;
   a hydraulic circuit comprising an oil pump driven by a motor for supplying hydraulic fluid to the piston chamber, a hydraulic fluid charging valve for containing hydraulic fluid in an oil passage leading from the oil pump to the piston chamber, an opening and closing valve for opening and closing the oil passage between the hydraulic fluid charging valve and the piston chamber, and an accumulator for storing the hydraulic pressure of the piston chamber; and
   a control means to supply a desired hydraulic pressure to the piston chamber by controlling driving of the oil pump by the motor and opening and closing of the opening and closing valve;
   wherein, as characteristics of hydraulic pressure applied to the piston chamber in the hydraulic circuit, a 1st characteristic is obtained by closing the opening and closing valve and progressively driving the oil pump and a 2nd characteristic is obtained by prohibiting driving of the oil pump along with progressively opening and closing the opening and closing valve; and
   wherein, at time of pressurizing the piston chamber, the control means performs control so that the piston chamber reaches a target hydraulic pressure based on the 1st characteristic, and, at time of depressurizing the piston chamber, performs control so that the piston chamber reaches a target hydraulic pressure based on the 2nd characteristic.

2. The hydraulic controller of driving force distribution device as claimed in claim 1;
   wherein the control means keeps engagement force of the frictional engagement elements constant at a hydraulic pressure of hydraulic fluid contained in the oil passage, by stopping driving of the oil pump with the motor, until starting depressurization of the piston chamber, after pressurizing the piston chamber to reach a target hydraulic pressure.

3. The hydraulic controller of driving force distribution device as claimed in claim 1;
   wherein hydraulic control based on the 1st characteristic is performed by controlling a drive voltage of the motor such that the oil pump reaches a desired discharge rate based on relationship between a previously measured drive voltage of the motor and a discharge rate of the oil pump; and
   wherein hydraulic control based on the 2nd characteristic is performed by controlling a drive voltage of the opening and closing valve such that the opening and closing valve reaches a desired valve opening position based on relationship between a previously measured drive voltage of the opening and closing valve and the valve opening position.

4. The hydraulic controller of driving force distribution device as claimed in claim 2;
   wherein hydraulic control based on the 1st characteristic is performed by controlling a drive voltage of the motor such that the oil pump reaches a desired discharge rate based on relationship between a previously measured drive voltage of the motor and a discharge rate of the oil pump; and
   wherein hydraulic control based on the 2nd characteristic is performed by controlling a drive voltage of the opening and closing valve such that the opening and closing valve reaches a desired valve opening position based on relationship between a previously measured drive voltage of the opening and closing valve and the valve opening position.

* * * * *